Figure 1:
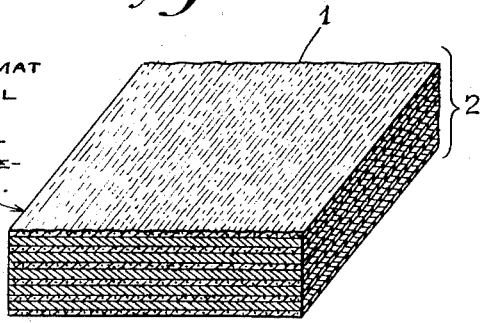

July 24, 1951  I. W. RUDERMAN  2,561,449

GLASS MAT LAMINATES

Filed Feb. 10, 1945

INVENTOR.
IRVING WARREN RUDERMAN,
BY *Ward Crosby & Neal*
ATTORNEYS.

Patented July 24, 1951

2,561,449

UNITED STATES PATENT OFFICE 2,561,449

GLASS MAT LAMINATES

Irving Warren Ruderman, Trenton, N. J., assignor to St. Regis Paper Company, New York, N. Y., a corporation of New York Application February 10, 1945, Serial No. 577,339

3 Claims. (Cl. 154—43)

This invention pertains to laminated plastic material characterized by exceptionally good electrical properties combined with good mechanical properties.

It is an object of this invention to provide a synthetic resin laminate which will have such desirable electrical characteristics as low moisture absorption, low power factor, low dielectric constant, high insulation resistance, and high resistance to fungus attack; combined with such desirable mechanical properties, as good punchability, and high density, hardness, and flexural strength. Such a product is of great value in electrical apparatus, particularly in the electronics field, for uses among others, such as in making intricate punchings where electrical properties must be of the highest possible order. It is very desirable when such apparatus is to be used in moist, hot countries to have these punchings effected as little as possible by moisture or fungi.

In accordance with the present invention, a laminated plastic which meets the above requirements to a superior degree, is obtained by bonding under heat and pressure, superimposed sheets, composed of glass fibers, impregnated with a synthetic resin obtained by refluxing, in the presence of an alkaline catalyst, such as ammonia, a mixture comprising a phenol, for example $C_6H_5.OH$, a primary aromatic amine, such as aniline, and an aldehyde, such as formaldehyde solution, in the preferred proportions of about 2:1:3 by weight. Preferred resins of this type and their production are described in a copending application of George P. Schmitt and Bernard Jaffe entitled "Reformable Plastic Materials," Serial No. 577,336 filed on even date herewith.

The sheet material of fibrous glass may be made by spinning and weaving the glass fibers into a cloth or mat, or by otherwise producing the fibrous glass material in sheet form. Preferably the sheet material is employed in the form of glass mat, as at present commercially produced, and consisting of fibers of glass formed into a mat and bonded together, in process of manufacture, with a small amount, for example, about 5 to 10%, of a straight phenol-formaldehyde resin. The mat may be employed in any desired thickness.

For purposes of forming the laminate, the glass cloth, mat, or other sheet material of fibrous glass, is impregnated with the aforesaid phenol-aromatic amine-aldehyde resin, specifically with a phenol-aniline-formaldehyde resin, following which successive layers of the thus impregnated sheets, are superimposed and united by application of heat and pressure.

An important aspect of the invention resides in the use of the aforesaid phenol-aromatic amine-aldehyde type of resin, for impregnating the glass sheet material prior to forming the laminate, because it has been found that this type of resin wets the glass fibers to an unexpected degree, thereby forming a strong, well bonded laminate. Furthermore, resins of the type aforesaid are soluble in common solvents, such as a mixture of isopropanol and toluene, thereby facilitating impregnation of the sheets. A further important aspect in the use of this type of resin, is that it imparts "post forming" properties to the laminate whereby it may be softened and easily punched at elevated temperature, or produced in flat sheets, and thereafter reshaped and reformed, by application of heat and pressure, and without delamination or cracking, into a desired, substantially permanent, infusible and insoluble, final state and shape.

Other types of resins do not possess these desirable properties as applied to the production of glass mat laminates. For example, straight phenol-aldehyde resins are not post formable and also result in glass mat laminates having poor mechanical and electrical properties. Aniline-aldehyde resins are likewise found to give poor electrical properties, and have the further disadvantage of not being soluble in common, safe and inexpensive solvents, thereby rendering impregnation of the glass mat, difficult.

By way of specific example, and in accordance with the aforesaid Schmitt and Jaffe application, the preferred impregnating resin may be made as follows:

*Example*

Sixty-five parts of phenol, 35 parts of aniline, 100 parts of formaldehyde (37% solution), and 3 parts of concentrated ammonium hydroxide solution, are refluxed together for about 90–100 minutes. The apparatus is then arranged for distillation under a vacuum of about 28 inches of mercury, and the resin is dehydrated until the temperature reaches about 90° to 100° C. At the end of the distillation, the resin is brought to the desired solids content by the addition of a 75/25 alcohol-toluene mixture (by volume), preferably isopropyl alcohol and toluene. Permissible variations from the above are set forth in the application referred to.

By way of specific example in forming a fiber glass laminate, employing a resin of the above mentioned character in accordance with the above example, glass mat sheets 0.040" in thickness and containing about 5 to 10% of a phenolic bonding resin, are impregnated with the above phenol-aniline-aldehyde resin, to a resin content of 56% after the solvent has been removed by oven drying. Liner sheets are impregnated with the same resin to give a higher resin content after drying, namely, 70%. A laminated sheet may be made by placing a sheet or sheets of the lower resin core material between two higher resin liner sheets and for example, pressing the assembly between chromium-plated steel plates in a hydraulic press at 250 pounds per sq. in. hydraulic pressure, and at a temperature of about 170° C. for forty minutes. The platens are then cooled and the finished laminate removed from the press.

A ⅛" thick laminate prepared in the manner described above had the following electrical and mechanical properties:

| | |
|---|---|
| Water absorption, % in 24 hours | 0.11 |
| Density | 1.41 |
| Hardness, Rockwell M scale | 90 |
| Flexural strength, p. s. i. | 12,130 |
| Power factor, %, $10^6$ cycles per second | |
| 1. As received | 1.25 |
| 2. After 24 hrs. in water | 1.33 |
| Dielectric constant | 3.33 |
| Insulation Resistance, megohms | |
| 1. Western electric test, 96 hrs. at 35° C. and 92% relative humidity | 305 |
| 2. R. C. A. test, 48 hrs. at 25° C. in $H_2O$ | 500 |
| 3. JAN-P13 test, 48 hrs. at 50° C. in $H_2O$ | 19 |
| Punchability, hot | Good |

The thickness of the glass mat laminate may be varied to any extent desired, and the resin content of the laminate likewise varied to give any desired variations and properties. The phenol-aniline-aldehyde resin may be prepared using various ratios of aniline to phenol to obtain different degrees of thermo-plasticity of the laminate, as set forth in the aforesaid Schmitt and Jaffe application.

In the laminate as thus produced the resin is in such state of cure, that while possessing strength characteristics, at normal temperatures, equal to or better than those of other types of resins, it also possesses the above mentioned "post formable" properties whereby the laminate may be softened and punched, at elevated temperatures, or otherwise formed into a desired and substantially permanent, infusible and insoluble, final shape and state.

Figure 3:
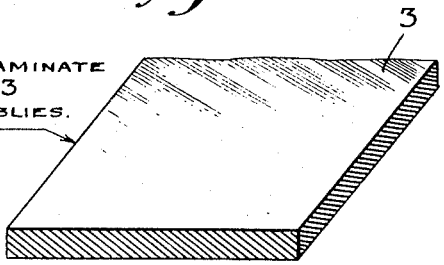
Figure 2:
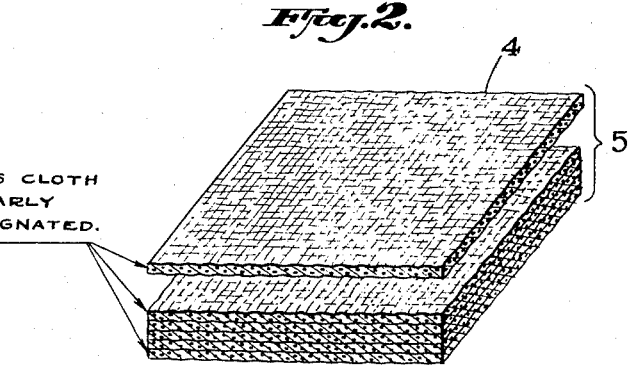

In the accompanying drawing illustrative of the invention:

Fig. 1 is an exploded, perspective view of a laminating build-up consisting of stacked sheets of glass fiber mat material impregnated with a phenol-aromatic amine-aldehyde resin; while Fig. 2 is a generally similar view of a laminating build-up consisting of stacked sheets of glass cloth impregnated with a phenol-aromatic amine-aldehyde resin. Fig. 3 is a perspective view of a hot-pressed laminate such as results from hot-pressing the build-ups of Figs. 1 and 2, respectively.

Referring to Fig. 1, glass fiber mat, sheet material, such as is indicated at 1, is impregnated with a phenol-aromatic amine-aldehyde laminating varnish such as that set forth in the above example, is then cut into sections of desired dimensions for laminating purposes, and stacked in superimposed relation as shown at 2, and thereupon subjected to a hot-pressing operation between chromium-plated steel platens, in an hydraulic press, at a pressure of about 250 pounds per square inch and at a temperature of about 170° C. for about 40 minutes. The platens are then cooled and the resulting product removed from the press, to give as an end product a finished laminate as illustrated at 3, Fig. 3, whereupon the superimposed sheets of glass fiber mat material are now impregnated with, and consolidated by, the phenol-aromatic amine-aldehyde resin referred to. In the modification of Fig. 3, sheet material consisting of glass cloth 4 woven from glass fibers, is similarly impregnated with a phenol-aromatic amine-aldehyde resin, and thereupon cut into sections of desired dimensions and stacked in superimposed relation as shown at 5, and thereupon subjected to the aforesaid hot-pressing operation, to give a finished laminate as shown at 3, Fig. 3.

In the Fig. 1 modification, the glass fibers may be initially bonded together with a small percentage of a synthetic resin such as about 5 to 10% of a phenolic resin, for example a straight phenol-formaldehyde resin or a phenol-analine-formaldehyde resin, and thereupon further impregnated with a phenol-aromatic amine-aldehyde resin as set forth in the above example. In the Fig. 2 modification, since the glass fibers are initially woven into the form of a glass cloth, no such initial bonding of the fibers is essential. In this instance, therefore, the cloth may be impregnated initially with the phenol-aromatic amine-aldehyde varnish of the above example, and thereupon stacked and hot-pressed, to give the finished laminate.

While the invention has been described in detail according to various preferred and desirable ways of carrying out the same, it will be obvious to those skilled in the art after understanding the invention that changes and modifications may be made therein without departing from the spirit and scope of the invention and it is intended in the appended claims to cover all such changes and modifications.

What is claimed as new and desired to be secured by Letters Patent is:

1. A laminating product comprising a sheet formed of glass fibers bonded together with a phenol-aldehyde resin, said sheet being further impregnated with a phenol-aromatic amine-aldehyde resin.

2. A laminated product comprising superimposed sheets of glass cloth, the fibers of which are bonded together by a phenol-aldehyde resin, said sheets being further impregnated with and united by a phenol-aromatic amine aldehyde resin.

3. A post formable laminated product comprising superimposed sheets formed of glass fibers bonded together by phenol-aldehyde resin, said sheets being further impregnated with and united by a phenol-aniline-aldehyde resin.

IRVING WARREN RUDERMAN.

REFERENCES CITED

The following references are of record in the file of this patent:

UNITED STATES PATENTS

| Number | Name | Date |
|---|---|---|
| 1,133,083 | Baekeland | Mar. 23, 1915 |
| 1,217,115 | Baekeland | Feb. 20, 1917 |
| 1,955,731 | Bender | Apr. 24, 1934 |
| 2,209,850 | Shand | July 30, 1940 |
| 2,252,157 | Bergin et al. | Aug. 12, 1941 |
| 2,285,679 | Pontius | June 9, 1942 |
| 2,314,701 | Harvey | Nov. 2, 1943 |
| 2,354,110 | Ford et al. | July 18, 1944 |

FOREIGN PATENTS

| Number | Country | Date |
|---|---|---|
| 508,035 | Great Britain | Nov. 29, 1938 |